United States Patent
Kumar et al.

(10) Patent No.: US 11,520,876 B2
(45) Date of Patent: Dec. 6, 2022

(54) EFFICIENTLY AUTHENTICATING AN APPLICATION DURING I/O REQUEST HANDLING

(71) Applicant: Dell Products L.P., Round Rock, TX (US)

(72) Inventors: Ankit Kumar, Bengaluru (IN); Gokul Thiruchengode Vajravel, Bangalore (IN); Abhishek Mathur, Allahabad (IN)

(73) Assignee: Dell Products L.P., Round Rock, TX (US)

( * ) Notice: Subject to any disclaimer, the term of this patent is extended or adjusted under 35 U.S.C. 154(b) by 338 days.

(21) Appl. No.: 16/780,108

(22) Filed: Feb. 3, 2020

(65) Prior Publication Data

US 2021/0240816 A1 Aug. 5, 2021

(51) Int. Cl.
| | |
|---|---|
| *G06F 21/51* | (2013.01) |
| *H04L 9/06* | (2006.01) |
| *G06F 21/62* | (2013.01) |
| *H04L 69/329* | (2022.01) |
| *G06F 9/54* | (2006.01) |
| *G06F 21/31* | (2013.01) |
| *H04L 67/1097* | (2022.01) |
| *G06F 21/44* | (2013.01) |
| *G06F 21/52* | (2013.01) |

(52) U.S. Cl.
CPC ............ *G06F 21/51* (2013.01); *G06F 9/542* (2013.01); *G06F 21/31* (2013.01); *G06F 21/44* (2013.01); *G06F 21/52* (2013.01); *G06F 21/6218* (2013.01); *H04L 9/0643* (2013.01); *H04L 67/1097* (2013.01); *H04L 69/329* (2013.01); *G06F 2221/2141* (2013.01)

(58) Field of Classification Search
None
See application file for complete search history.

(56) References Cited

U.S. PATENT DOCUMENTS

| | | | | | |
|---|---|---|---|---|---|
| 8,239,915 | B1 * | 8/2012 | Satish | ...................... | G06F 21/00 |
| | | | | | 726/4 |
| 8,863,232 | B1 * | 10/2014 | Tidd | .................... | G06F 21/6281 |
| | | | | | 726/4 |
| 8,950,007 | B1 * | 2/2015 | Teal | ....................... | H04L 63/101 |
| | | | | | 726/30 |
| 11,470,096 | B2 * | 10/2022 | Muddu | ............... | H04L 63/1433 |
| 2005/0177539 | A1 * | 8/2005 | Goodwin | ................ | G06F 16/10 |

(Continued)

*Primary Examiner* — Michael W Chao
(74) *Attorney, Agent, or Firm* — Kirton McConkie; Brian Tucker

(57) ABSTRACT

A security client can efficiently authenticate an application during I/O request handling by maintaining a white list that identifies processes that have been created for authenticated applications. The security client can register to be notified when a process is being created. When such a notification is received, the security client can authenticate the application for which the process is being created and then add an entry to the white list that includes the process identifier of the process being created. Then, when the process subsequently generates I/O requests, the security client can use the white list to quickly determine that the process pertains to an authenticated application and allow the I/O requests to modify protected artifacts.

19 Claims, 11 Drawing Sheets

(56) References Cited

U.S. PATENT DOCUMENTS

| | | | | |
|---|---|---|---|---|
| 2005/0210035 A1* | 9/2005 | Kester | | H04L 63/1416 |
| 2006/0150256 A1* | 7/2006 | Fanton | | G06F 21/44 |
| | | | | 726/27 |
| 2007/0156659 A1* | 7/2007 | Lim | | H04L 41/0893 |
| 2009/0113528 A1* | 4/2009 | Ananda | | H04L 67/141 |
| | | | | 726/5 |
| 2010/0275026 A1* | 10/2010 | McLean | | G06F 21/12 |
| | | | | 713/176 |
| 2011/0296525 A1* | 12/2011 | Turbin | | G06F 21/566 |
| | | | | 726/23 |
| 2012/0110174 A1* | 5/2012 | Wootton | | H04L 63/1416 |
| | | | | 709/224 |
| 2012/0254995 A1* | 10/2012 | Sallam | | G06F 21/52 |
| | | | | 726/22 |
| 2013/0097660 A1* | 4/2013 | Das | | H04L 63/10 |
| | | | | 726/1 |
| 2014/0096246 A1* | 4/2014 | Morrissey | | H04W 12/128 |
| | | | | 726/23 |
| 2015/0040246 A1* | 2/2015 | Yuen | | H04W 12/10 |
| | | | | 726/30 |
| 2016/0099963 A1* | 4/2016 | Mahaffey | | H04L 69/14 |
| | | | | 726/25 |
| 2016/0371472 A1* | 12/2016 | Walsh | | G06F 21/10 |
| 2018/0082047 A1* | 3/2018 | Mayo | | G06F 21/121 |
| 2018/0157834 A1* | 6/2018 | Continella | | G06F 21/554 |
| 2018/0351969 A1* | 12/2018 | MacLeod | | G06F 21/554 |
| 2019/0073471 A1* | 3/2019 | Haruki | | G06F 21/53 |
| 2020/0026846 A1* | 1/2020 | Choi | | G06F 21/44 |
| 2020/0089876 A1* | 3/2020 | Aharoni | | G06F 21/566 |
| 2020/0252429 A1* | 8/2020 | Vissamsetty | | H04L 61/2007 |
| 2020/0285761 A1* | 9/2020 | Buck | | G06F 21/62 |
| 2021/0144617 A1* | 5/2021 | Gokturk | | H04W 24/10 |
| 2022/0188425 A1* | 6/2022 | Wyatt | | G06F 8/61 |
| 2022/0253520 A1* | 8/2022 | Schrag | | H04W 4/14 |

* cited by examiner

EFFICIENTLY AUTHENTICATING AN APPLICATION DURING I/O REQUEST HANDLING

CROSS-REFERENCE TO RELATED APPLICATIONS

N/A

BACKGROUND

File system filters are used in a number of security solutions to limit access to protected files. These filters can register to receive I/O requests that are being passed down the file system stack so that they can determine whether to allow each individual I/O request. As an example, a file system filter may be configured to only allow a particular application to access a certain set of protected files.

Providing this type of filtering may add significant delay to the processing of the I/O requests. In particular, while handling an I/O request that targets a protected file, the security solution may identify and verify the application that originated the I/O request, determine that the application is allowed to access the protected file and then pass the I/O request down the file system stack. If this functionality is performed in a secure and robust fashion, the resulting delay may be noticeable to the end user.

To avoid the delay that a robust solution would introduce, many security solutions merely perform a simple verification based on the name of the executable that originated the I/O request. For example, a security solution may maintain a list of executable names that are allowed to access protected files. In such cases, upon receiving an I/O request that targets a protected file, the security solution will only need to identify the name of the executable that created the I/O request and then determine whether the name is in the list. Although this provides some security, it is easily bypassed by malicious users. For example, a malicious user would only need to create a rogue executable that has the same name as an executable in the list to enable the rogue executable to freely access protected files.

BRIEF SUMMARY

The present invention extends to methods, systems and computer program products for efficiently authenticating an application during I/O request handling. A security client can efficiently authenticate an application during I/O request handling by maintaining a white list that identifies processes that have been created for authenticated applications. The security client can register to be notified when a process is being created. When such a notification is received, the security client can authenticate the application for which the process is being created and then add an entry to the white list that includes the process identifier of the process being created. Then, when the process subsequently generates I/O requests, the security client can use the white list to quickly determine that the process pertains to an authenticated application and allow the I/O requests to modify protected artifacts.

In some embodiments, the present invention can be implemented by a security filter of a security client as a method for efficiently authenticating an application during I/O request handling. The security filter can register to be notified when a process is created. In response to a notification that a first process is being created, the security filter can identify an application for which the first process is being created, obtain a precomputed hash for the application, compute a hash for the application and compare the computed hash to the precomputed hash. Upon determining that the computed hash matches the precomputed hash, the security client can store an identifier of the first process. In response to receiving an I/O request that was initiated by the application, the security driver can authenticate the application by determining that a process identifier associated with the I/O request matches the stored identifier of the first process.

In other embodiments, the present invention can be implemented by a security filter of a security client as a method for efficiently authenticating an application during I/O request handling. The security filter can register a first callback routine to be called when a process is being created and a second callback routine for handling I/O requests. In response to the first callback routine being called when a first process is being created, the security filter can perform the following within the first callback routine: identify a name of an application's executable for which the first process is being created; send the name to a security service; receive, from the security service, a precomputed hash that is associated with the name; calculate a hash of the application's executable; compare the calculated hash to the precomputed hash; and in response to determining that the calculated hash matches the precomputed hash, store an identifier of the first process in a white list. In response to the second callback routine being called to handle a first I/O request, the security filter can perform the following within the second callback routine: obtain a process identifier associated with the first I/O request; and access the white list to determine that the process identifier associated with the first I/O request matches the stored identifier of the first process.

In other embodiments, the present invention can be implemented in the form of computer storage media that stores computer executable instructions which when executed implement a security client that includes a security filter. The security filter can be configured to perform a method for efficiently authenticating an application during I/O request handling. The method may include: maintaining a white list that identifies process identifiers of running applications that have been authenticated; receiving an I/O request that attempts to open a handle to an artifact; in response to receiving the I/O request, obtaining a process identifier of a first running application that created the I/O request; determining that the process identifier of the first running application is included in the white list; and allowing the first running application to obtain the handle and then use the handle to modify the artifact.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Embodiments of the present invention may be implemented on computing devices using a security client that may include a security filter and a security service. In this specification and the claims, the term "security filter" may represent a file system filter driver (e.g., a file system minifilter driver in the Windows architecture) alone or both a file system filter driver and a registry filter driver. In other words, the present invention may be implemented in Windows environments where both a file system filter driver and a registry filter driver would typically be employed and in non-Windows environments where a file system filter driver alone may be employed. The term "artifacts" should be construed as encompassing files, folders and/or registry entries. A "protected artifact" should be construed as an artifact that is protected by a security client. The terms "process," "executable" and "application" will, in some contexts, be used interchangeably. For example, a process may be viewed as an executable that is being executed while an application may consist of one or more processes.

Figure 1:
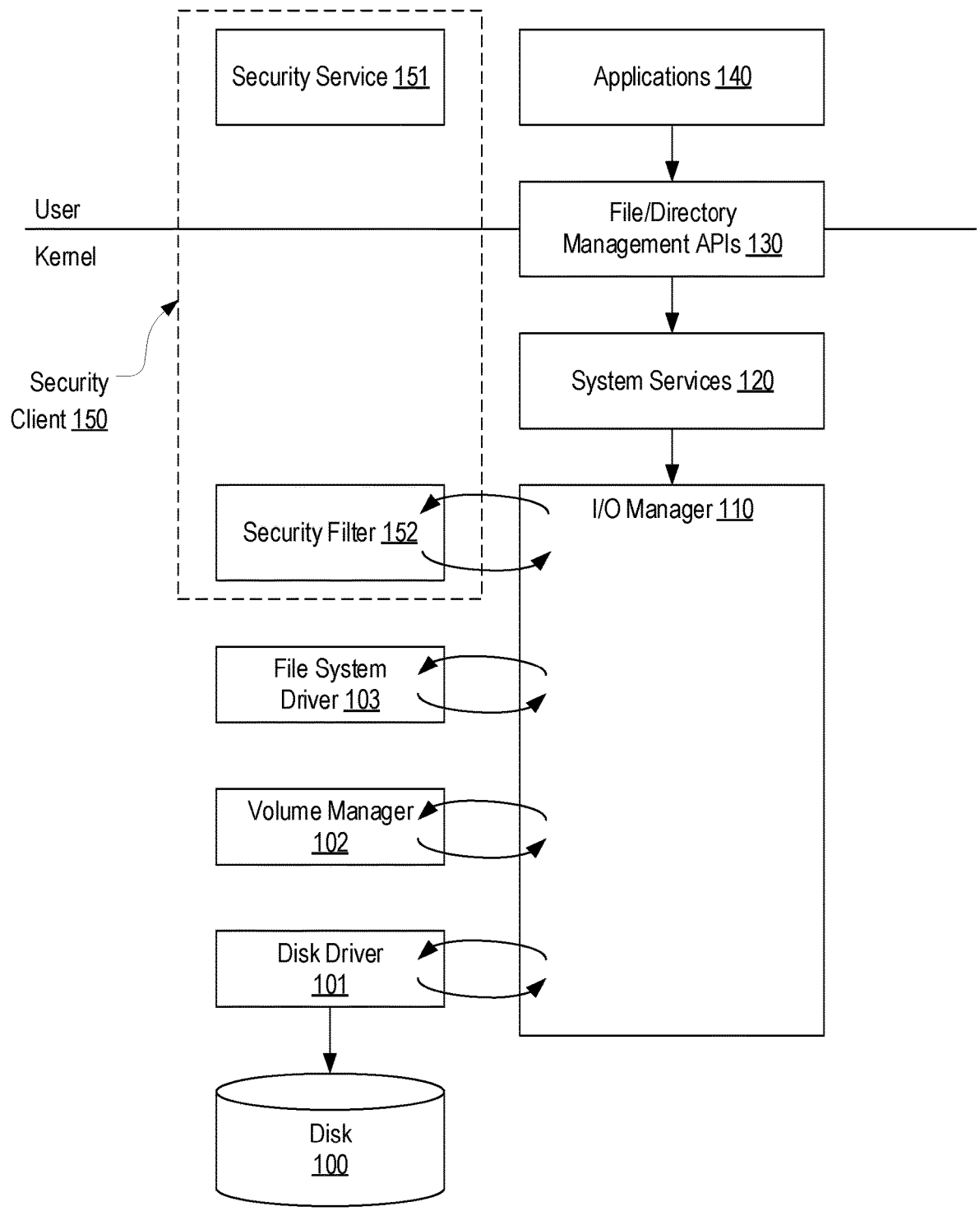
FIG. 1 illustrates an example computing architecture in which the present invention may be implemented.

FIG. 1 illustrates how a security client 150 can be employed on a Windows-based computing device. As shown, a computing device may include a disk 100 that includes a volume with a file system. To allow artifacts in the file system to be accessed, a driver stack that includes a disk driver 101, a volume manager 102 and a file system driver 103, among possibly other drivers, can be loaded on the computing device. As is known, an I/O manager 110 manages the flow of I/O requests within the driver stack. Although not shown, I/O manager 110 can include a filter manager by which file system minifilter drivers are loaded on the driver stack.

Applications 140 can access artifacts in the file system via system services 120 by invoking file/directory management APIs 130 (e.g., CreateFile, WriteFile, SetFileInformation, etc.). In accordance with embodiments of the present invention, a security client 150 can also be executed on the computing device. Security client 150 includes a security filter 152, which may be a kernel-mode file system minifilter driver, and a security service 151, which may run in user mode. For simplicity, FIG. 1 only shows a security filter 152 in the form of a file system minifilter driver. However, as indicated above, a security filter 152 can also be in the form of a registry filter that interfaces with the Windows Configuration Manager to filter registry operations.

Because security filter 152 is loaded above file system driver 103, it will have the opportunity to process I/O requests before they are passed to file system driver 103 thereby enabling security client 150 to block unauthorized access to protected artifacts. In accordance with embodiments of the present invention, security filter 152 can work in conjunction with security service 151 to enable security filter 152 to efficiently authenticate an application during the handling of an I/O request that the application originated. In other words, the present invention enables a secure and robust verification process to be performed on each I/O request without incurring the delay that prior solutions introduce. FIGS. 2A-2E provide an overview of the functionality that security client 150 may perform to accomplish this.

Figure 2A:
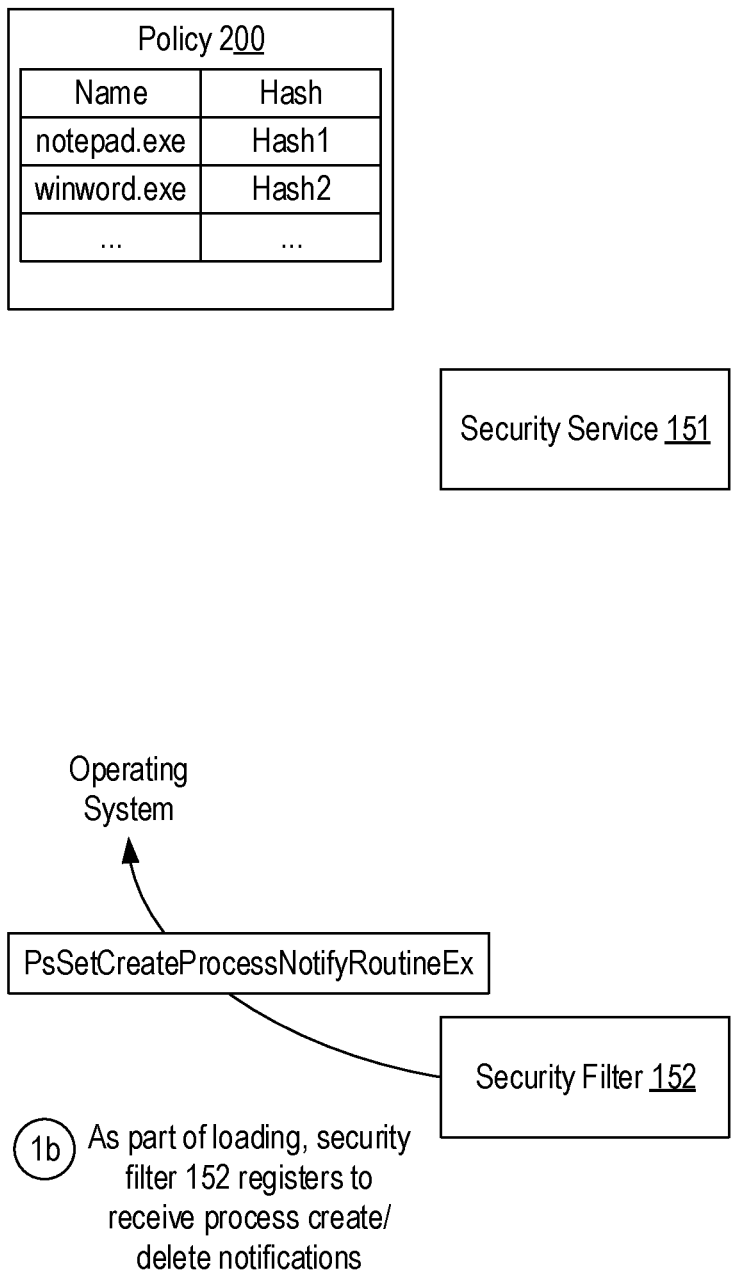
FIGS. 2A-2E illustrate an example of how a security client can efficiently authenticate an application during I/O request handling.

In FIG. 2A, it is assumed that, in step 1a, security filter 152 is being loaded on the computing device. For example, in Windows implementations, a driver is loaded when its driver entry routine is called. In step 1b, as part of loading (e.g., as part of its driver entry routine), security filter 152 can register to be notified when processes are created and deleted. For example, security filter 152 could call the PsSetCreateProcessNotifyRoutineEx function to register a callback routine that the operating system will call when any process is created or deleted. Although not shown, security filter 152 could also register to receive certain types of IRPs (or registry operations). For example, as a file system minifilter driver, security filter 152 could register a callback routine that is called when IRP_MJ_CREATE, IRP_MJ_WRITE and IRP_MJ_SET_INFORMATION requests are generated. Similarly, as a registry filter, security filter 152 could register a callback routine that is called when any registry operation is performed.

FIG. 2A also shows that a policy 200 exists on the computing device and is accessible to security service 151. As shown, policy 200 can list executables (or more generally "applications") that are allowed to modify protected artifacts along with a precomputed hash (or digital signature) of each listed executable. In this context, a "precomputed hash" should be construed as a hash that has been calculated on an executable that is known to be legitimate. For example, as part of defining policy 200, an administrator could generate a precomputed hash from an executable that is known to be safe. In FIG. 2A, policy 200 is shown as listing notepad.exe and winword.exe (the executables for Notepad and Word respectively) with precomputed hashes, hash1 and hash2 respectively, for these executables. As described below, policy 200 could define other criteria that could be used when determining whether to allow access to an artifact.

Figure 2B:
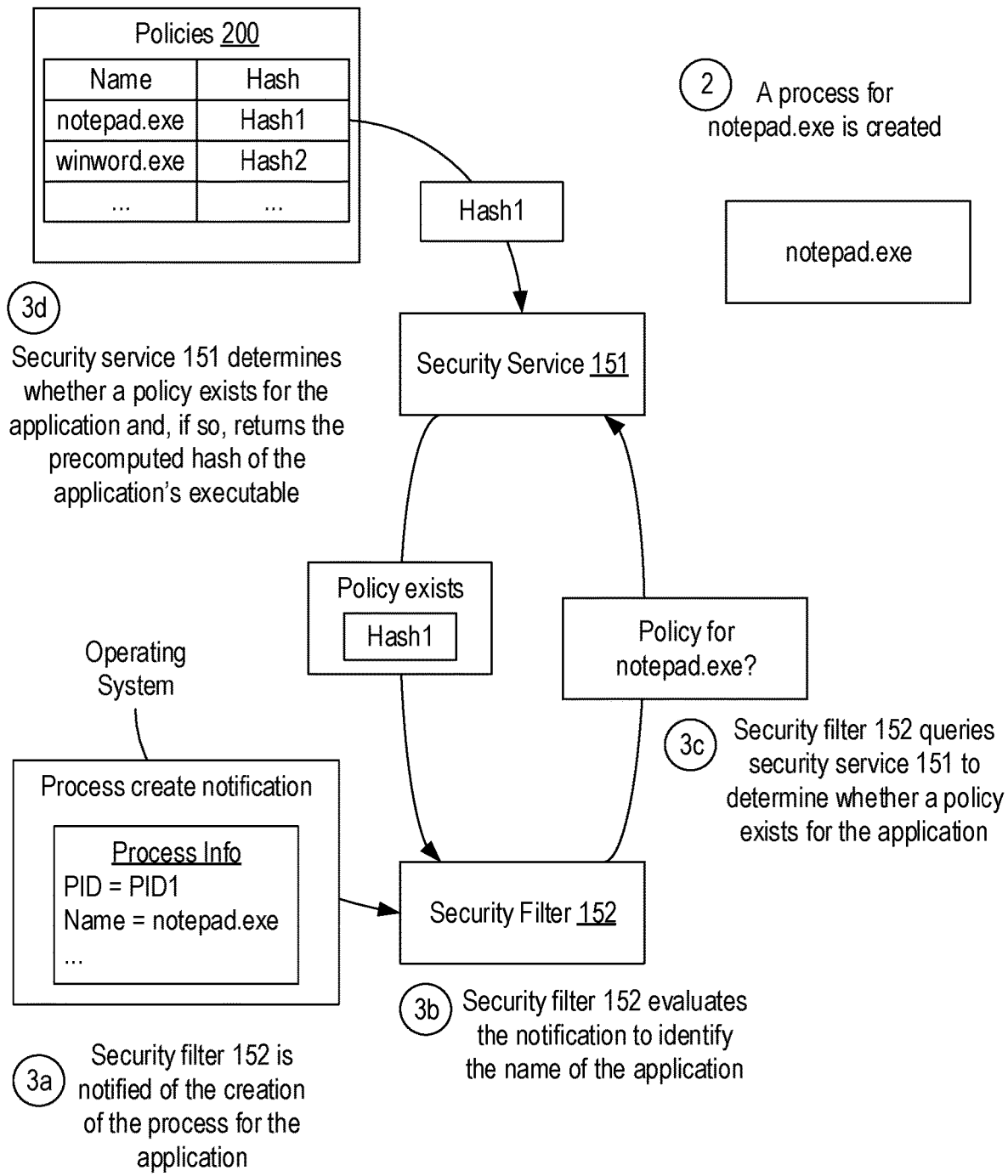

Turning to FIG. 2B, it is assumed that security filter 152 has completed loading and that, in step 2, a process is created for executing notepad.exe. As an example, this may occur when a user launches Notepad. Because security filter 152 registered to be notified when processes are created, in step 3a, the operating system will notify security filter 152 that the process is being created to execute notepad.exe. For example, the operating system can call the callback routine that security filter 152 registered during its driver entry routine. As part of calling this callback routine, the operating system can pass the process identifier (PID) and a PS_CREATE_NOTIFY_INFO structure that includes information about the newly created process. In step 3b, security filter 152 could access this information to identify the name (notepad.exe) of the process. Alternatively, security filter 152 could employ the PID to retrieve the name of the process and possibly other information such as the full path of the executable.

In step 3c, security filter 152 can employ the name of the process that is being created to query security service 151. This query can request that security service 151 determine whether policies 200 indicate that notepad.exe is authorized to modify protected artifacts. In step 3d, security service 151 can access policies 200 using the name received from security filter 152 (and possibly the full path of the executable). As a result, security service 151 will determine that policies 200 includes a matching entry for notepad.exe and can return the precomputed hash (or digital signature) of notepad.exe (hash1) to security filter 152. In contrast, if security service 151 had determined that policies 200 did not include an entry for notepad.exe (or otherwise indicated that notepad.exe is not authorized to modify protected artifacts), security service 151 could inform security filter 152 accordingly.

Figure 2C:
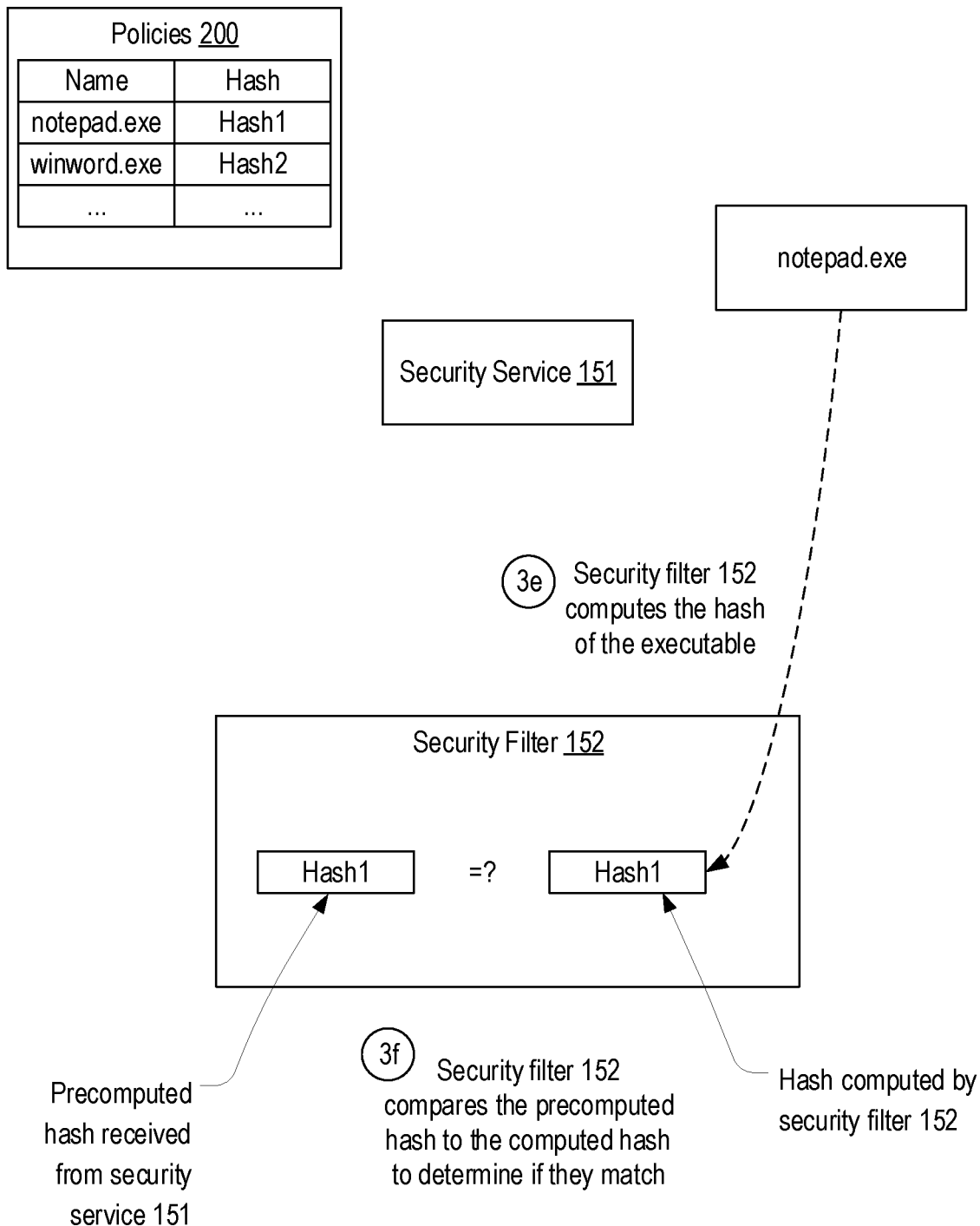

Turning to FIG. 2C, in conjunction with receiving the precomputed hash of notepad.exe, in step 3e, security filter 152 can compute a hash of notepad.exe—i.e., of the executable for which the process is being created. Then, in step 3f, security filter 152 can compare the precomputed hash received from security service 151 to the hash that security filter 152 has computed to determine if they match. A match would indicate that the executable for which the process is being created is the same, unmodified executable from which the hash was precomputed. Notably, if the executable for which the process is being created happens to be a malicious executable that has been named notepad.exe and stored in place of the legitimate notepad.exe, this comparison would fail.

Figure 2D:
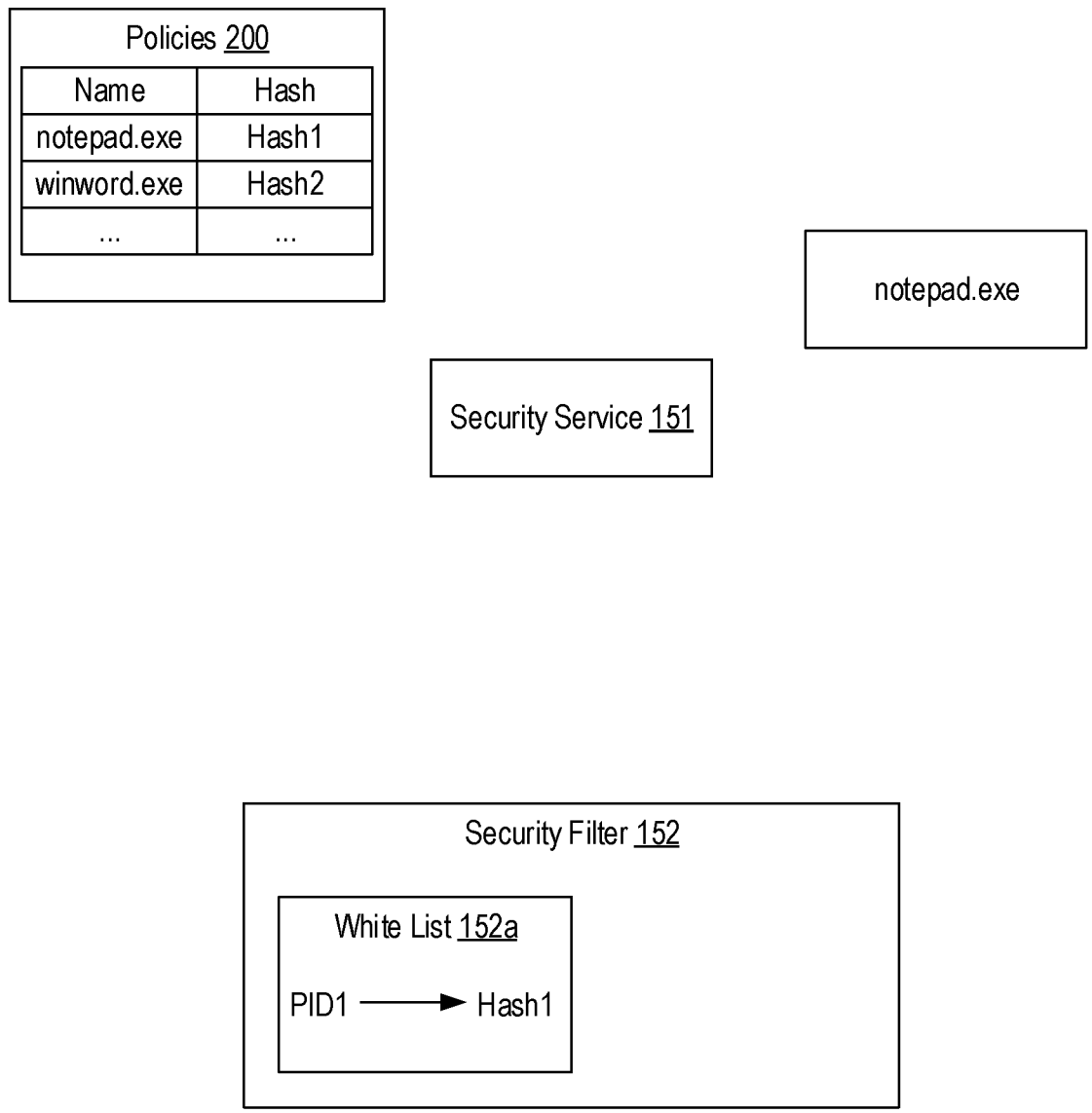

Turning to FIG. 2D, in response to determining that the precomputed hash matches the computed hash, in step 3g, security filter 152 can add an entry to a white list 152a that maps the PID of the process being created (PID1) to the hash of the executable (e.g., as a key value pair). Notably, steps 3a-3g are performed as part of security filter 152's callback routine that it registered for process create notifications—i.e., not as part of security filter 152's handling of an I/O request that targets a protected artifact. Although not shown, when the process for notepad.exe is deleted (e.g., when the user closes Notepad), security filter 152's callback routine would again be called to notify security filter 152 that the process is being deleted. In response, security filter 152 could employ the PID specified in the call to the callback routine to locate and remove the corresponding entry from white list 152a. Accordingly, at any given time, white list 152a may include an entry for any running process which, according to policies 200, is allowed to modify protected artifacts.

Figure 2E:
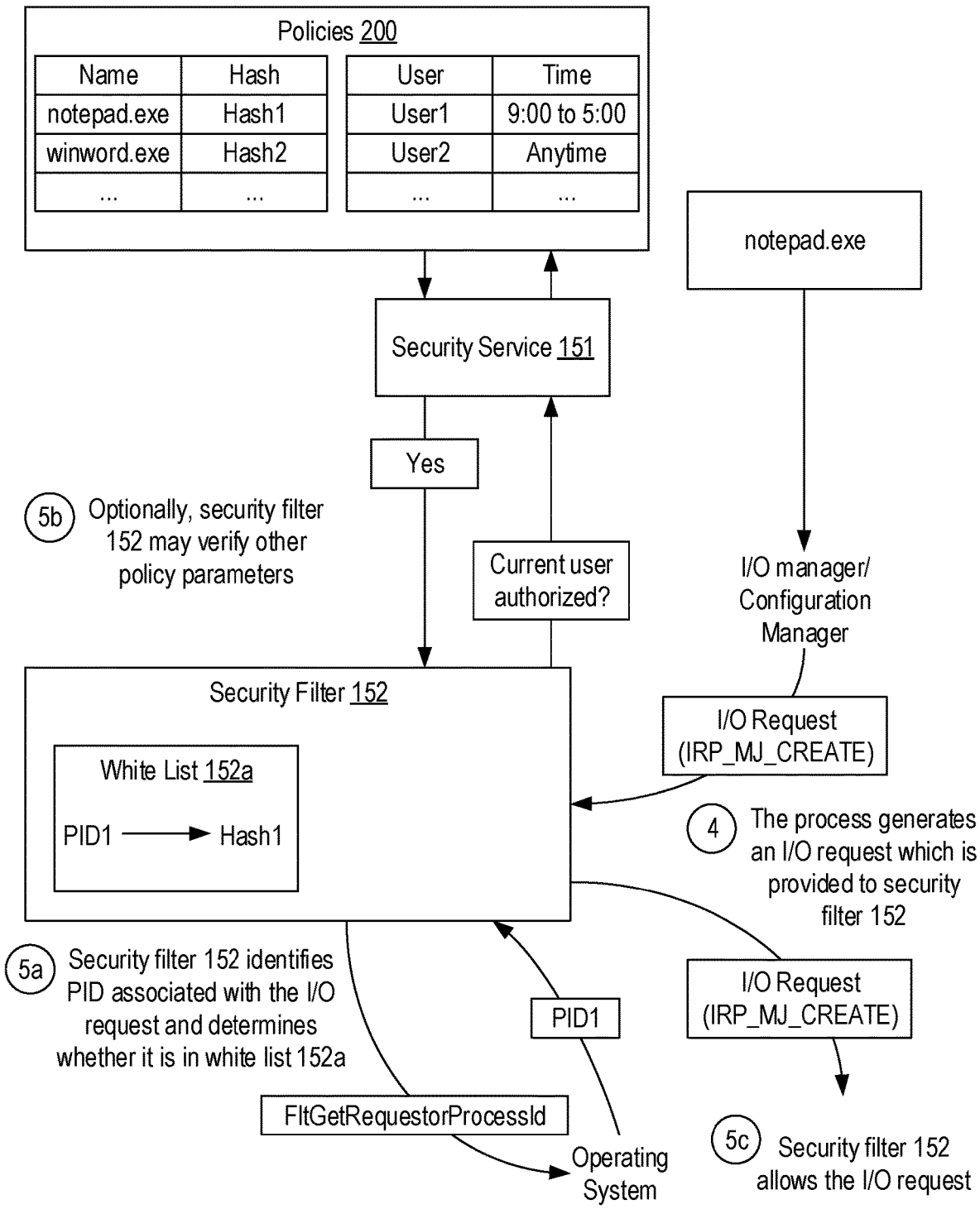

FIG. 2E represents the functionality that security filter 152 can perform when notepad.exe (or any other process) is used to access a protected artifact. As is known, to access an artifact, a handle to the artifact must first be obtained. From security filter 152's perspective, an attempt to obtain a handle would be in the form of an IRP_MJ_CREATE IRP (or in the case of the registry, in the form of a REG_CREATE_KEY_INFORMATION (or similar) structure). In step 4, it is assumed that notepad.exe is attempting to open (or create) a protected file which has caused an IRP_MJ_CREATE request to be created and passed down the driver stack. Because security filter 152 has registered for such IRPs, I/O manager 110 will call security filter 152's registered callback routine to allow security filter 152 to handle the IRP before it is passed down to file system driver 103. As part of its handling within this callback routine, in step 5a, security filter 152 can identify the PID of the process that originated the IRP. For example, security filter 152 could call FltGetRequestorProcessId to retrieve the PID of the process (which is PID1 in this case) and can then compare the PID to the entries in white list 152a. In this case, security filter 152a will determine that an entry exists for PID1 and determine that the process that generated the IRP is authorized to modify the protected artifact.

In step 5b, security filter 152 may optionally query security service 151 to verify other policy parameters. For example, policies 200 may dictate when certain users are allowed to modify protected artifacts. In such cases, step 5b may include identifying the current user and determining whether policies 200 indicate that the current user is authorized to modify the protected artifact. Similarly, step 5b may include determining whether the current user is authorized to modify the protected artifact at the current time.

In the present example, it is assumed that policies 200 dictate that the current user is authorized to modify the protected artifact at the current time using notepad.exe and therefore, in step 5c, security filter 152 can allow the I/O request and pass it down the driver stack. In contrast, if any determination in step 5a or 5b had failed, security filter 152 could perform functionality to prevent the process from modifying the targeted artifact as described in further detail below.

Due to the functionality that security filter 152 performs when a process is created, the processing that security filter 152 performs when handling individual I/O requests is greatly reduced without sacrificing security. For example, because security filter 152 verifies an application's executable and determines whether the executable is authorized to modify protected artifacts—both in response to the creation of a process for the application, security filter 152 can authenticate the application during handling of an I/O request by determining that a corresponding entry exists in white list 152a.

Figure 3A:
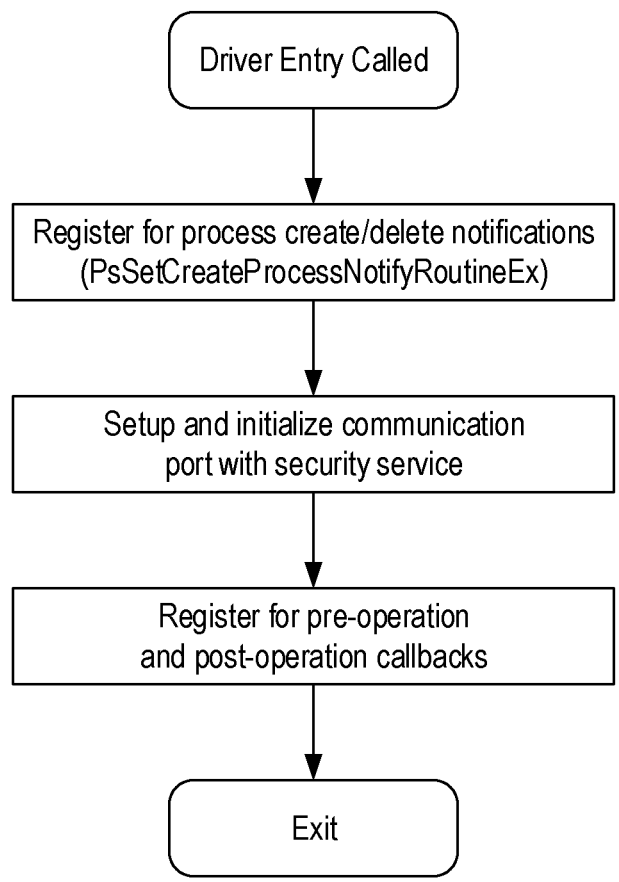
FIGS. 3A and 3B provide flow diagrams representing functionality that a security driver can perform as part of its driver entry routine and as part of a callback routine for process create/delete notifications respectively.

FIG. 3A provides a flow diagram summarizing the functionality that security driver 152 may perform as part of its driver entry routine. As shown, security driver 152 can register to receive process create/delete notifications such as by calling the PsSetCreateProcessNotifyRoutineEx function to register a callback routine that the operating system will call whenever a process is created or deleted. Security driver 152 can also set up and initialize a communication port with security service 151 such as by calling the FltCreateCommunicationPort function. Security driver 152 can also register to receive certain types of I/O requests such as by calling FltRegisterFilter to specify callback routines for the types of I/O requests or, in the case of a registry filter, by calling the CmRegisterCallbackEx function.

Figure 3B:
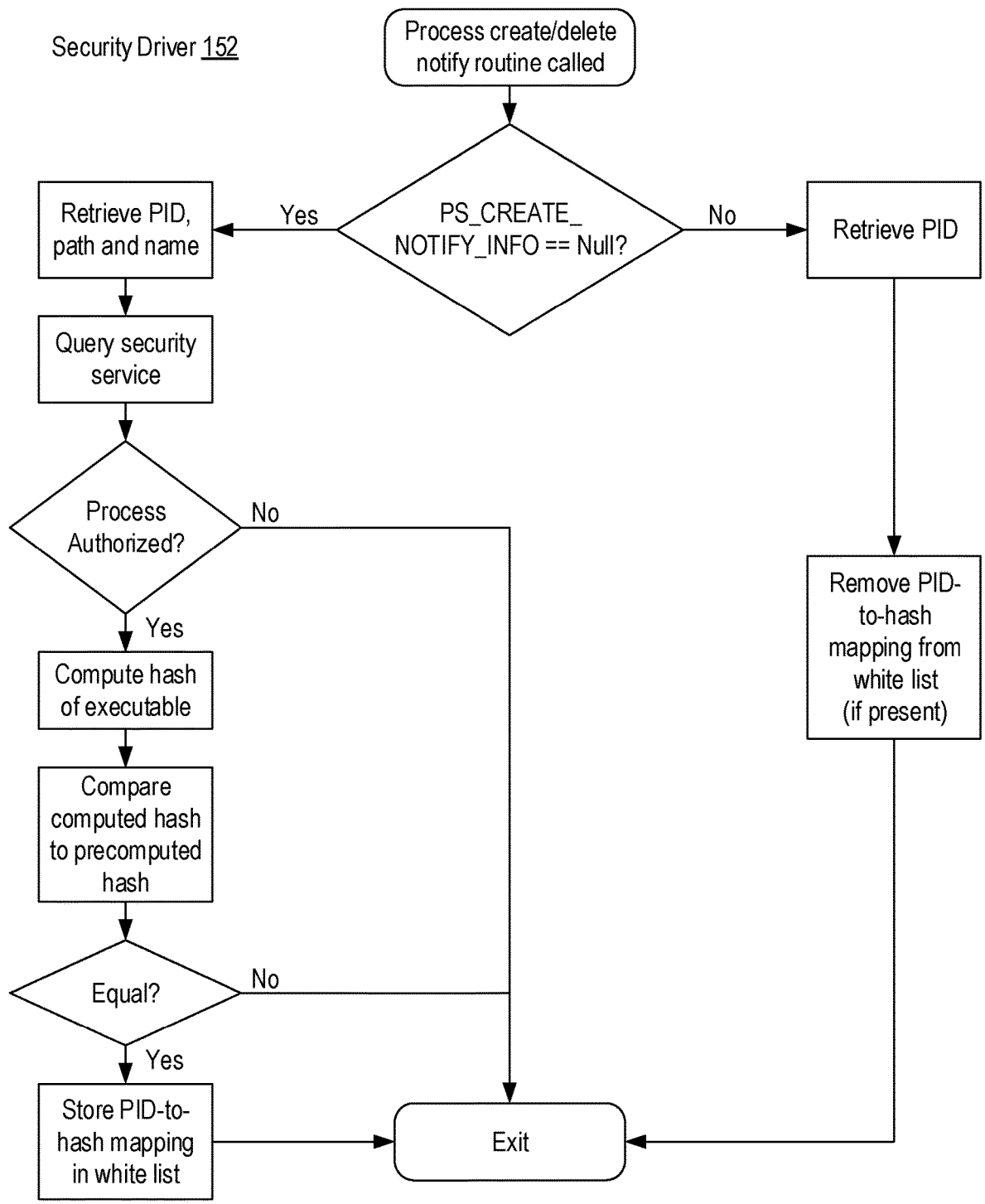

FIG. 3B provides a flow diagram summarizing the functionality that security driver 152 may perform as part of its callback routine that it registered to be called when processes are created or deleted. When this callback routine is called, security driver 152 can determine whether the PS_CREATE_NOTIFY_INFO structure is null, which would indicate that a process is being deleted. If so, security driver 152 can retrieve the PID of the process that is being deleted and remove the corresponding entry from white list 152a if one exists. By removing the entry when the process is deleted, security driver 152 can ensure that the corresponding executable will again be verified when the application is subsequently run. After removing the entry, or determining that no entry exists, security driver 152 can exit the callback routine.

If security driver 152 determines that the PS_CREATE_NOTIFY_INFO structure is not null, which would indicate that a process is being created, it can retrieve the PID of the process being created, the name of the executable (or application) for which the process is being created and possibly the full path to the executable. Security driver 152 can then query security service 151 to determine whether the process (or application/executable) is allowed to modify protected artifacts. This can be accomplished by sending the name to security service 151 for comparison with policies 200. To enhance security, security service 151 may send the full path of the executable to security service 151 to allow security service 151 to compare the name and path of the executable to policies 200 to thereby prevent a malicious executable that is named the same as but stored in a different location from an authorized executable from modifying protected artifacts.

Upon receiving a response to its query, security driver 152 can determine whether the response indicates that the process (or application/executable) is authorized to modify protected artifacts. If not, security driver 152 can forego adding an entry to white list 152*a* for the process and exit the callback routine. On the other hand, if the process is authorized to modify protected artifacts, the response received from security service 151 will include the precomputed hash of the executable (or more particularly, the precomputed hash of a known/legitimate executable with the same name and path as the executable for which the process is being created). Security driver 152 can then compute a hash of the executable for which the process is being created and compare the computed hash to the precomputed hash. If they do not match, which would likely indicate that the executable for which the process is being created has been tampered with, security driver 152 can determine that the executable for which the process is being created is not authorized to modify protected artifacts and can therefore forego adding an entry to white list 152*a* for the process and exit the callback routine. In some embodiments, when the hashes do not match, security driver 152 may even prevent the process from loading. In contrast, if the computed hash matches the precomputed hash, which would indicate that the executable for which the process is being created has not been tampered with, security driver 152 can add an entry to white list 152*a* which maps the PID to the hash and then exit the callback routine.

Figure 3C:
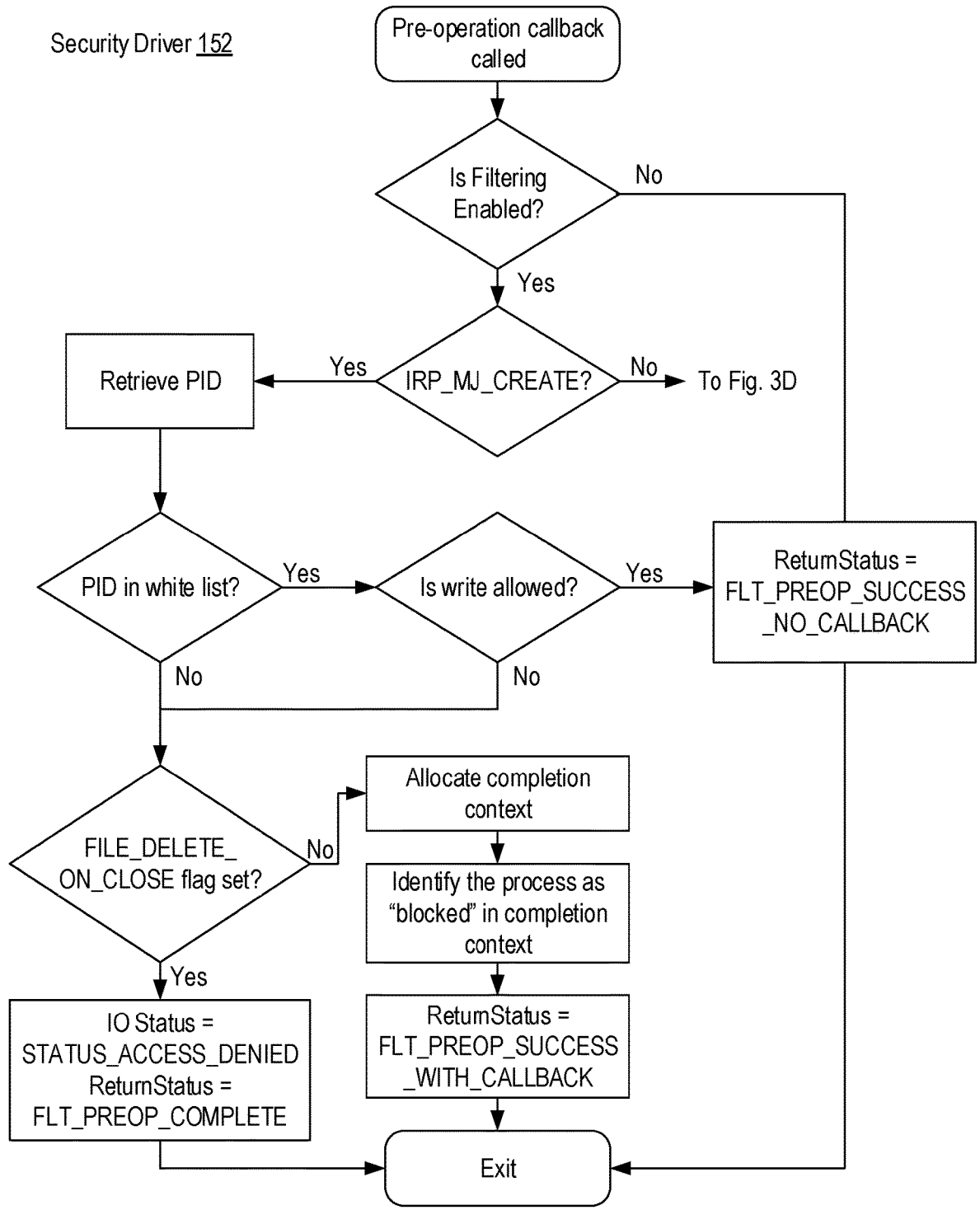
FIGS. 3C-3E provide flow diagrams representing functionality that a security driver can perform as part of its callback routines for I/O requests.
Figure 3D:
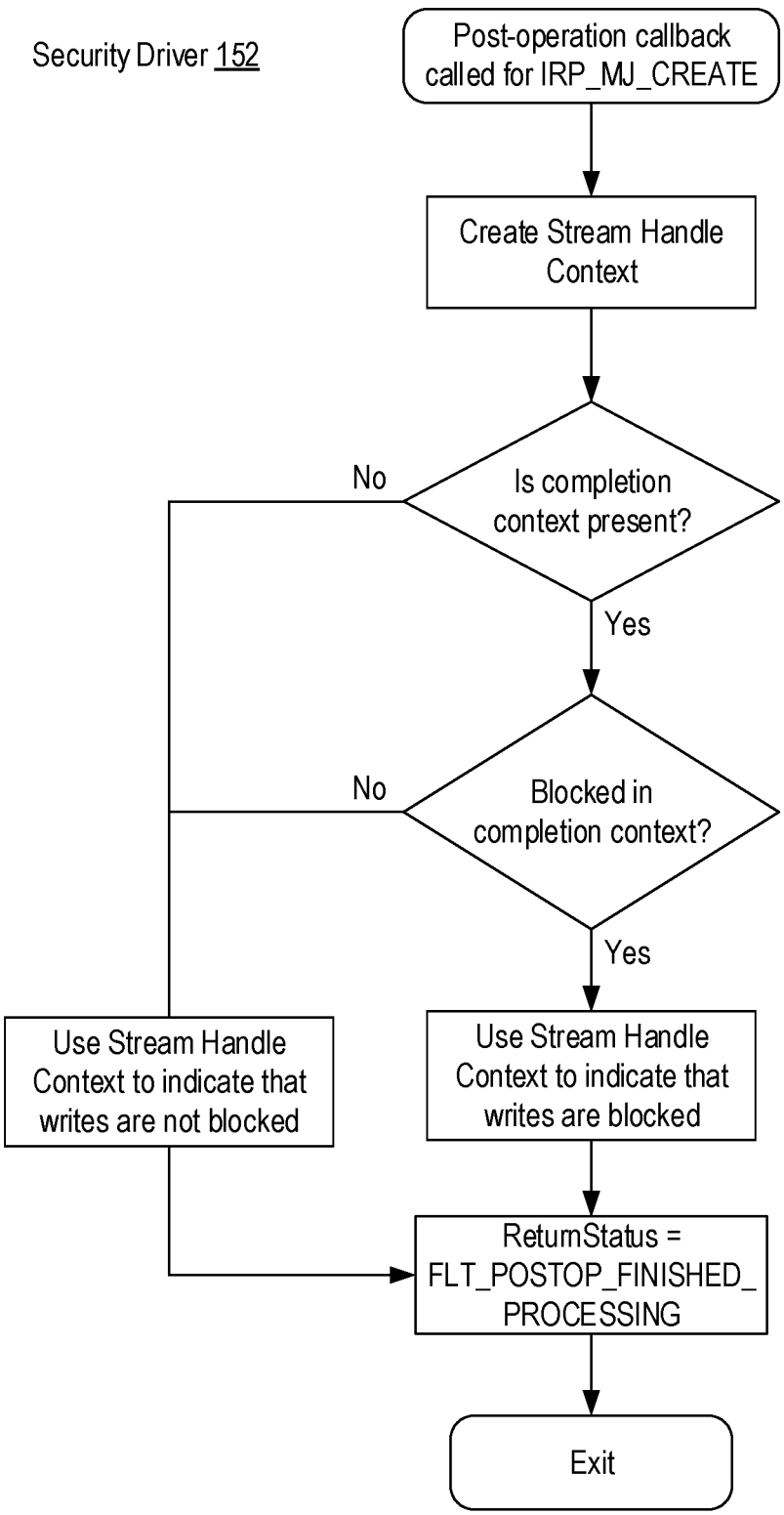
Figure 3E:
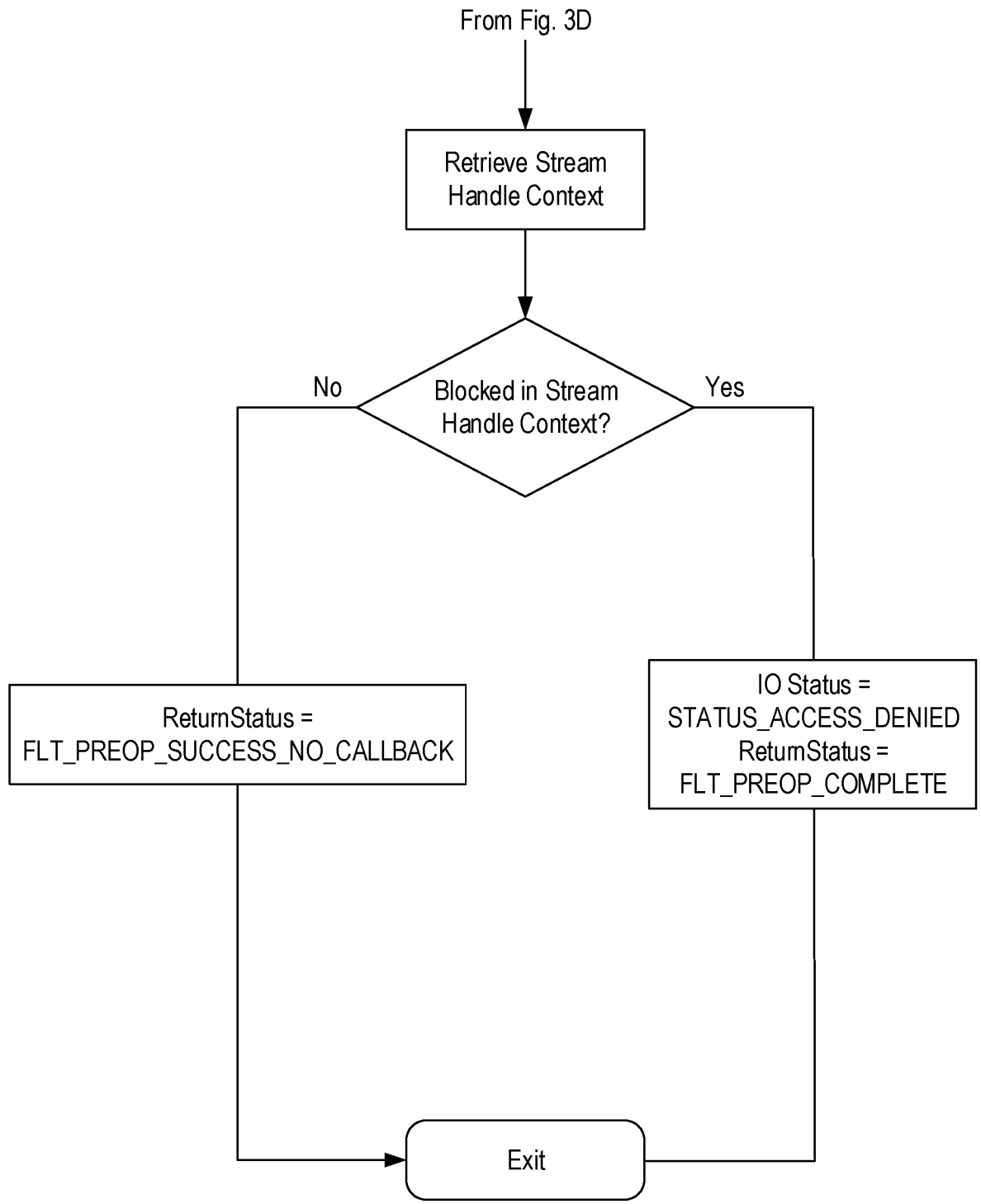

FIGS. 3C-3E provide flow diagrams summarizing the functionality that security driver 152, when in the form of a file system minifilter driver, can perform as part of its callback routines for handling I/O requests. FIG. 3C represents the functionality that security driver 152 performs when its preoperation callback routine is called. Initially, when security driver 152 is passed an I/O request (e.g., an IRP), it can determine whether filtering is enabled. For example, security service 152 could be configured to instruct security driver 152 to commence filtering (e.g., after the computing device starts up and security client 150 is fully loaded) or to cease filtering (e.g., when an administrator temporarily disables filtering). If security driver 152 is passed an I/O request while filtering is not enabled, it can simply pass the I/O request down the driver stack such as by returning a status of FLT_PREOP_SUCCESS_NO_CALLBACK.

In contrast, if filtering is enabled, security driver 152 can determine the type of the I/O request. If the I/O request is an IRP_MJ_CREATE request, which may indicate that an application is attempting to obtain a handle to a file, security driver 152 can retrieve the PID of the process associated with the I/O request and may also identify the artifact that the I/O request targets. Security driver 152 can then determine whether the PID is included in white list 152*a* and, if so, conclude that the process (or application/executable) that originated the I/O request is authenticated. Once the process is authenticated, security driver 152 can determine whether writes to the targeted file (or artifact) are allowed. As addressed above, this determination could involve querying security service 151 to compare the current user and/or current time to policies 200. This determination could also involve querying security service 151 to compare the targeted artifact to policies 200 to determine if the targeted artifact is a protected artifact. Accordingly, the step of determining whether an authenticated application can be used to modify a protected artifact could involve many different types of comparisons. If writes are allowed, security driver 152 can pass the I/O request down the driver stack such as by returning a status of FLT_PREOP_SUCCESS_NO_CALLBACK.

If security driver 152 determines that the PID is not in white list 152*a*, it may not simply block access to the artifact, but can perform additional functionality to enable read access. This additional functionality may include determining whether the FILE_DELETE_ON_CLOSE flag is set in the I/O request. When this flag is set, the file system will cause the file to be deleted once all handles to it are closed. Accordingly, to prevent an unauthenticated application from deleting files, when this flag is set, security driver 152 can fail the I/O request such as by setting the I/O status to STATUS_ACCESS_DENIED and the return status to FLT_PREOP_COMPLETE and then exiting its callback routine.

If this flag is not set, security driver 152 can allocate a "completion context" for the I/O request (e.g., in the form of an instance context) and use the completion context to indicate that the process cannot perform a write (e.g., by defining a mapping within the context between an identifier of the IRP_MJ_CREATE and "blocked"). This completion context will allow security driver 152 to retrieve the "blocked" determination when the IRP_MJ_CREATE request is passed back up the driver stack. Finally, security driver 152 can pass the I/O request down the driver stack such as by setting the return status to FLT_PREOP_SUCCESS_WITH_CALLBACK and exiting its callback routine. By using this status, security driver 152's post-operation callback for IRP_MJ_CREATE requests will be called once the lower level drivers have completed their handling of the I/O request.

FIG. 3D represents the functionality that security driver 152 can perform within is post-operation callback routine for IRP_MJ_CREATE requests. FIG. 3D therefore represents the functionality that security driver 152 will perform on an IRP_MJ_CREATE request that was originated by an "unauthorized" application and that is being passed back up the driver stack. At this point, the IRP_MJ_CREATE should define a handle to the targeted artifact. Security driver 152 can allocate and set a stream handle context on this handle to define the blocked status for the associated file. In particular, security driver 152 can determine whether a completion context pertaining to the IRP_MJ_CREATE request is present. If not, security driver 152 can use the stream handle context to indicate that writes to the corresponding file are not blocked. In contrast, if a completion context is present, security driver 152 can set the stream handle context consistent with the completion context. For example, if the completion context indicates that writes are blocked, security driver 152 can set the stream handle context to so indicate. Setting the stream handle context in this manner ensures that the handle to the file cannot be used by any process to modify the file as will be described below.

FIG. 3E represents the functionality that security driver 152 can perform within its preoperation callback routine on I/O requests that would modify a file (e.g., IRP_MJ_WRITE requests and IRP_MJ_SET_INFORMATION requests). A process may initiate such I/O requests after obtaining the handle to the file via the IRP_MJ_CREATE request. Security driver 152 can retrieve the stream handle context that it would have previously set for the handle to the targeted file. If the stream handle context indicates that writes are blocked, security driver 152 can fail the I/O request such as by setting the IO status to STATUS_ACCESS_DENIED and the return status to FLT_PREOP_COMPLETE and then exiting its callback routine. In contrast, if the stream handle context indicates that writes are not blocked, security driver 152 can pass the I/O request down the driver stack such as by setting the return status to FLT_PREOP_SUCCESS_NO_CALLBACK and exiting its callback routine.

As can be seen, if security driver 152 has created (and not yet deleted) an entry in white list 152a for a process, security driver 152 can securely allow I/O requests that the process creates without needing to perform a complex verification of the authenticity/authorization of the corresponding application/executable for each I/O request. Stated another way, due the functionality that security driver 152 performs in its callback routine for process create/delete notifications, the amount of functionality that security driver 152 performs when handling individual I/O requests is greatly reduced without sacrificing security.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media includes signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A method, performed by a security filter of a security client, for efficiently authenticating an application during I/O request handling, the method comprising:
   registering to be notified when a process is created;
   in response to a notification that a first process is being created, identifying an application for which the first process is being created;
   obtaining a precomputed hash for the application;
   computing a hash for the application and comparing the computed hash to the precomputed hash;
   upon determining that the computed hash matches the precomputed hash, storing an identifier of the first process that was created for the application to thereby enable the identifier of the first process to be used to authenticate the application when the application subsequently initiates I/O requests in the context of the first process;
   in response to receiving an I/O request that was initiated by the application in the context of the first process, authenticating the application by determining that a process identifier associated with the I/O request matches the stored identifier of the first process; and
   in response to a notification that the first process is being terminated, discarding the stored identifier of the first process.

2. The method of claim 1, wherein identifying the application for which the process is being created comprises obtaining a name of the application's executable.

3. The method of claim 1, wherein identifying the application for which the process is being created comprises obtaining a full path of the application's executable.

4. The method of claim 1, wherein obtaining the precomputed hash for the application comprises sending a name of the application's executable to a security service, wherein the security service uses the name to access a policy in which the name is mapped to the precomputed hash.

5. The method of claim 1, wherein the precomputed hash for the application is a precomputed hash of the application's executable and wherein computing the hash for the application comprises computing a hash of the application's executable for which the first process is being created.

6. The method of claim 1, further comprising:
   in conjunction with authenticating the application, accessing a policy to determine whether a current user is authorized to use the application to modify an artifact that is the target of the I/O request.

7. The method of claim 1, wherein the I/O request is an IRP_MJ_CREATE request.

8. The method of claim 1, further comprising:
   maintaining a white list that identifies process identifiers of running applications that have been authenticated, wherein storing the identifier of the first process comprises storing the identifier of the first process in the white list.

9. The method of claim 8, wherein authenticating the application by determining that the process identifier associated with the I/O request matches the stored identifier of the first process comprises accessing the white list.

10. A method, performed by a security filter of a security client, for efficiently authenticating an application during I/O request handling, the method comprising:
- registering a first callback routine to be called when a process is being created;
- registering a second callback routine for handling I/O requests;
- in response to the first callback routine being called when a first process is being created, performing the following within the first callback routine:
  - identifying a name of an application's executable for which the first process is being created;
  - sending the name to a security service;
  - receiving, from the security service, a precomputed hash that is associated with the name;
  - calculating a hash of the application's executable;
  - comparing the calculated hash to the precomputed hash; and
  - in response to determining that the calculated hash matches the precomputed hash, storing an identifier of the first process in a white list to thereby enable the identifier of the first process to be used to authenticate the application when the application subsequently initiates I/O requests in the context of the first process;
- in response to the second callback routine being called to handle a first I/O request, performing the following within the second callback routine:
  - obtaining a process identifier associated with the first I/O request; and
  - accessing the white list to determine that the process identifier associated with the first I/O request matches the stored identifier of the first process; and
  - in response to determining that the process identifier associated with the first I/O request matches the stored identifier of the first process, allowing the first I/O request; and
- in response to a notification that the first process is being terminated, discarding the stored identifier of the first process.

11. The method of claim 10, wherein sending the name to the security service includes sending a full path to the application's executable.

12. The method of claim 10, further comprising:
- in response to the second callback routine being called to handle a second I/O request, performing the following within the second callback routine:
  - obtaining a process identifier associated with the second I/O request;
  - accessing the white list to determine that the process identifier associated with the second I/O request is not included in the white list; and
  - associating context with the second I/O request, the context indicating that modifications to a file targeted by the second I/O request should be blocked.

13. The method of claim 10, further comprising:
- in response to the second callback routine being called to handle the first I/O request, also performing the following within the second callback routine:
  - querying the security service to determine whether a current user can modify a file targeted by the first I/O request.

14. The method of claim 10, wherein the second callback routine is registered for handling IRP_MJ_CREATE requests, and wherein the first I/O request is an IRP_MJ_CREATE request.

15. One or more computer storage media storing computer executable instructions which when executed implement a method for efficiently authenticating an application during I/O request handling, the method comprising:
- registering to be notified when a process is created;
- in response to a notification that a first process is being created, identifying an application for which the first process is being created;
- obtaining a precomputed hash for the application;
- computing a hash for the application and comparing the computed hash to the precomputed hash;
- upon determining that the computed hash matches the precomputed hash, storing an identifier of the first process that was created for the application to thereby enable the identifier of the first process to be used to authenticate the application when the application subsequently initiates I/O requests in the context of the first process;
- in response to receiving an I/O request that was initiated by the application in the context of the first process, authenticating the application by determining that a process identifier associated with the I/O request matches the stored identifier of the first process; and
- in response to a notification that the first process is being terminated, discarding the stored identifier of the first process.

16. The computer storage media of claim 15, wherein identifying the application for which the process is being created comprises obtaining a name of the application's executable.

17. The computer storage media of claim 15, wherein identifying the application for which the process is being created comprises obtaining a full path of the application's executable.

18. The computer storage media of claim 15, wherein obtaining the precomputed hash for the application comprises sending a name of the application's executable to a security service, wherein the security service uses the name to access a policy in which the name is mapped to the precomputed hash.

19. The computer storage media of claim 15, wherein the precomputed hash for the application is a precomputed hash of the application's executable and wherein computing the hash for the application comprises computing a hash of the application's executable for which the first process is being created.

* * * * *